H. LECHTENBERG.
DUST COLLECTOR.
APPLICATION FILED APR. 29, 1914.
1,110,699.
Patented Sept. 15, 1914.
2 SHEETS—SHEET 2.
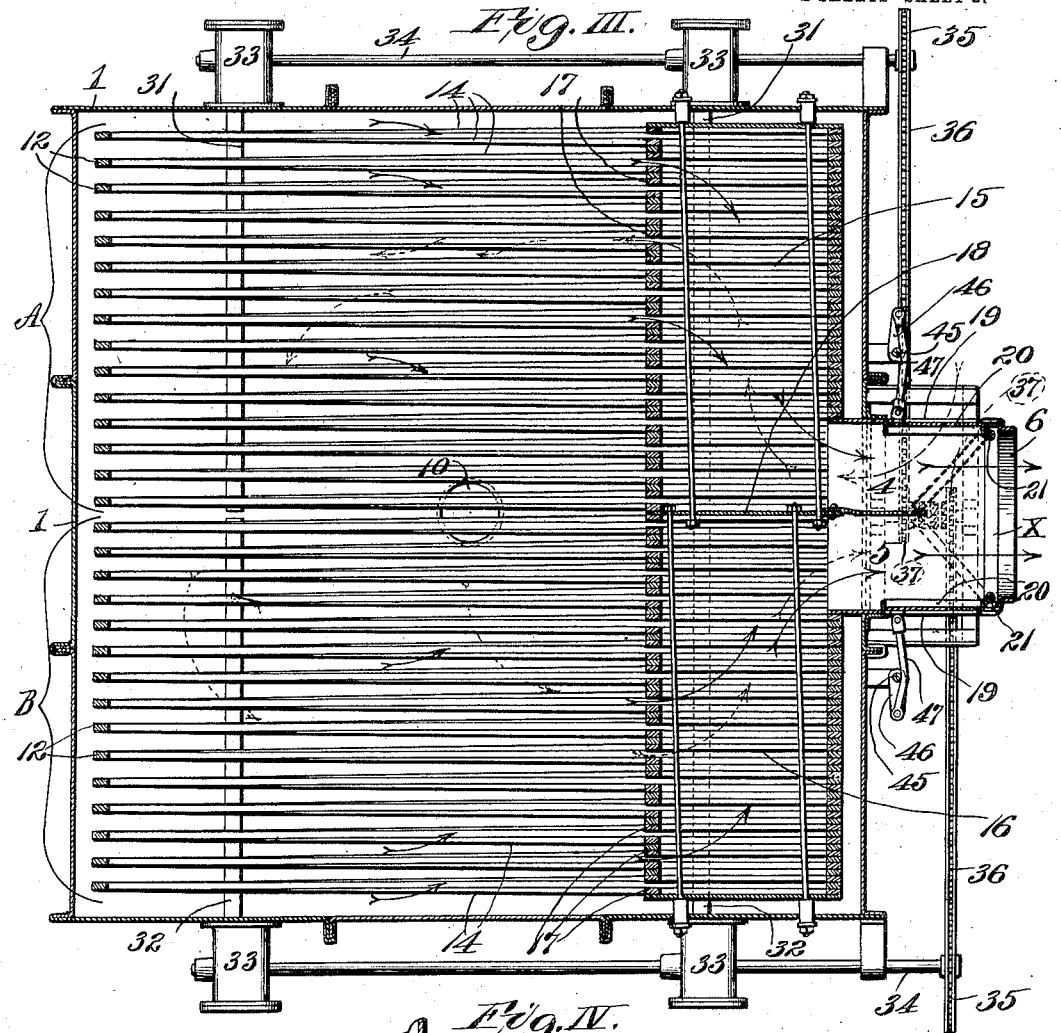
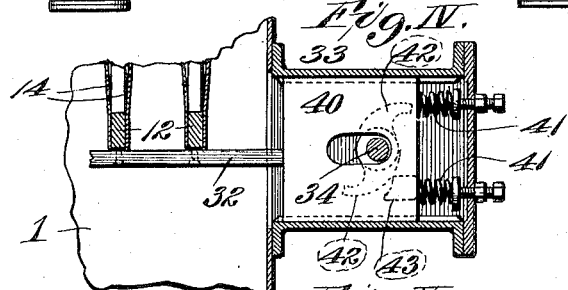
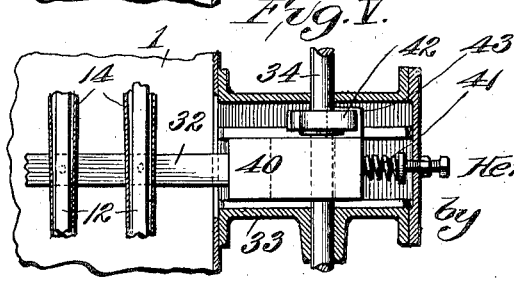
Attest:
Wm. H. Scott
E. H. Clark
Inventor:
Henry Lechtenberg,
by Knth & Cook
Attys.

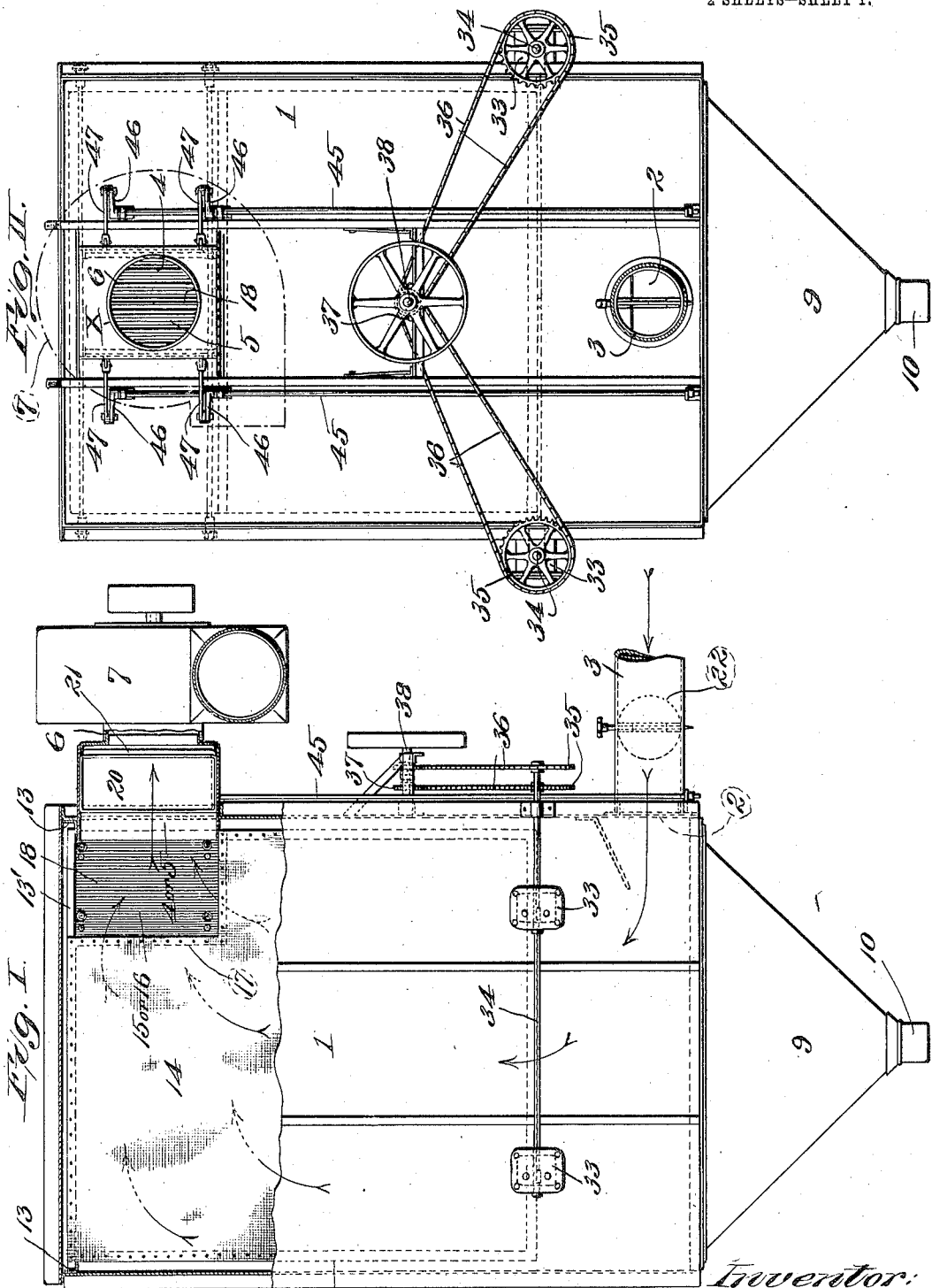

UNITED STATES PATENT OFFICE.

HENRY LECHTENBERG, OF QUINCY, ILLINOIS, ASSIGNOR TO W. T. LECHTENBERG.

DUST-COLLECTOR.

1,110,699. Specification of Letters Patent. Patented Sept. 15, 1914.

Application filed April 29, 1914. Serial No. 835,119.

*To all whom it may concern:*

Be it known that I, HENRY LECHTENBERG, a citizen of the United States of America, and a resident of Quincy, in the county of Adams and State of Illinois, have invented certain new and useful Improvements in Dust-Collectors, of which the following is a full, clear, and exact description, reference being had to the accompanying drawings, forming a part of this specification.

My invention relates to a dust collector, the principal object being to produce a dust collector which is so constructed that the dust adhering to its filtering devices may be easily and quickly removed.

The preferred form of my invention preferably comprises filtering devices arranged in a dust receiving housing, an outlet device through which air is discharged from said housing, and an exhaust fan or blower for drawing air through said parts. The outlet device is provided with a plurality of suction chambers communicating with the filtering devices. When the dust collector is in operation dust laden air is admitted to the dust receiving housing and the dust collects on the surface of the filtering devices while the air passing through the filtering devices is discharged into the suction chamber. Each suction chamber is preferably provided with an inlet port through which air may flow from the exterior of the housing to the filtering device associated with said suction chamber, and a valve in the suction chamber may be operated to open and close said inlet port. This valve normally closes the inlet port but it may be moved to close the suction chamber at a point between the filtering device and the exhaust fan. The exhaust fan normally draws air through both of the filtering devices and through the suction chambers associated therewith. In cleaning the filtering material the direction of movement of the air is reversed so that the air passing through the filtering material tends to loosen and remove the dust therefrom. Either of the filtering devices may be cleaned while the fan is in operation by opening the inlet port in the suction chamber associated with said filtering device and closing the suction chamber at a point between said inlet port and the fan. The air will then rush through the open inlet port in the suction chamber and instead of passing directly to the fan this air will flow in a reverse direction, pass through the filtering devices in a direction opposite to the direction of flow of the air during the filtering operation, thereafter flowing to the fan by passing through the other filtering device.

Figure I is a side elevation, partly in section, of a dust collector embodying the features of my invention. Fig. II is a front elevation of the dust collector shown in Fig. I. Fig. III is an enlarged horizontal section taken through the upper portion of the dust collector showing the outlet device through which air is discharged from the filtering elements. Fig. IV is a vertical section of the jarring device. Fig. V is a horizontal section of the jarring device.

1 designates a dust receiving housing provided with an inlet opening 2, and 3 is a delivery pipe for conducting dust laden air to the inlet opening. An outlet device X is provided with suction chambers 4 and 5 through which air is discharged from the housing. A suction pipe 6 communicating with the suction chamber, leads to an exhaust fan 7. 9 designates a hopper arranged below the housing 1 and provided with a discharge member 10 at its lower end. The filtering elements preferably comprise rectangular outer frames 12 having top members 13' which rest on angle bars 13 at the upper end of the housing. The filtering material preferably consists of fabric webs 14 secured to the rectangular outer frames. Passageways 15 and 16 located in the filtering devices are formed in part by the rectangular outer frames 12 and in part by inner frame bars 17. The outer frames 12 are separated from each other to admit the dust laden air to the filtering material and the frame bars 17 are separated from each other, as seen in Fig. III, to permit the filtered air to flow from the filtering material to the passageways 15 and 16. The filtering elements in the housing 1 constitute 2 filtering devices designated A and B in Fig. III. The passageway 15 is formed in one of the upper corners of the filtering device A while the passageway 16 is located at a similar point in the filtering device B. 18 designates a division plate separating the passageway 15 from the passageway 16.

The operation of my dust collector is as follows: The exhaust fan 7 is operated to draw the dust laden air from the delivery pipe 3 to the filtering devices A and B and the dust collects on the filtering material 14 while the filtered air passing through said material is conducted through the passageways 15 and 16 and discharged into the suction chambers 4 and 5 from which it is conducted to the fan 7 by the suction pipe 6. In passing through the filtering devices the air is divided into two oppositely moving currents one of which flows out through the passageway 15 and suction chamber 4, while the other passes through the passageway 16 and suction chamber 5. Each of the suction chambers 4 and 5 is provided with an inlet port 19 and a valve or closure 20 which normally closes said inlet port as shown in full lines Fig. III. The closures 20 are hinged at 21 and either of these closures may be shifted to the position shown in dotted lines Fig. III.

The filtering device A may be cleaned while the exhaust fan is in operation by closing a valve 22 (Fig. I) in the delivery pipe 3 to prevent the admission of dust laden air into the housing 1, and shifting the valve 20 in the suction chamber 4 to the position shown in dotted lines Fig. III. The parts are then so positioned that the air supply cannot enter the housing at the main inlet opening 2, and in response to the action of the exhaust fan, air is drawn into the apparatus at the inlet opening 19 of suction chamber 4 as indicated by the dotted arrow Fig. III. The closure 20 in suction chamber 4 is positioned to prevent the incoming air from flowing directly to the fan, and the closure 20 in suction chamber 5 is positioned to permit the flow of air from the filtering device B to the fan. The air enters at the inlet port 19 of the suction chamber 4, flows into the passageway 15 and through the filtering material of the filtering device A in a direction opposite to the direction of flow during the filtering operation, thus loosening and removing the dust from the filtering device A. The air current then flows through the filtering device B into the passageway 16 and is drawn through the suction chamber 5 and suction pipe 6 leading to the exhaust fan. The suction fan may be operated with the parts positioned as just described for any desired length of time to thoroughly clean the filtering material of the filtering device A, and the closure 20 in the suction chamber 4 is then shifted to the position shown in full lines Fig. III, thereby closing the inlet port 19 and at the same time opening the outer end of the suction chamber 4. The valve 22 is then opened. This places the closure in its normal position and in response to the operation of the fan the air currents will flow through the filtering devices as indicated by the arrows shown in full lines Fig. III. It will be readily understood that the filtering device B may be cleaned by shifting the closure 20 in suction chamber 5 to the position shown in dotted lines, thereby opening the inlet port 19 in suction chamber 5 and closing the outer end of said suction chamber. The direction of flow of the air in suction chamber 5 will then be reversed and the air will flow from said suction chamber through the filtering material of the filtering device A, and finally pass from the housing through the suction chamber 4. The means for operating the closures 19 preferably comprises vertical rock shafts 45 provided with arms 46 connected to the closures 19 by links 47.

My dust collector is preferably provided with a jarring device adapted to shake or vibrate the filtering material when the direction of flow of the air is reversed to dislodge the dust from said material, and the jarring mechanism is so constructed that the filtering device A may be vibrated independently of the filtering device B.

31 designates shaker bars connecting the frames of the filtering device A and 32 designates similar bars connecting the frames of the filtering device B. Each filtering device is a yieldable structure which may be jarred by striking its shaker bars.

33 designates hammer housings secured to the side walls of the main housing 1 adjacent to the outer ends of the shaker bars 31 and 32. Drive shafts 34 rotatably mounted in the hammer housings are provided with sprocket wheels 35 adapted to be driven by chains 36 passing around drive wheels 37, the latter being secured to a drive shaft 38. Each hammer housing 33 is open at its inner end to receive one of the shaker bars and closed at its outer end to prevent the escape of dust from the main housing 1. Each of the jarring devices I have shown comprises a hammer 40 slidably mounted in the hammer housing 33 and springs 41 tending to throw the hammer into engagement with a shaker bar.

42 designates cam fingers located in the hammer housing 33 and secured to the rotatable shaft 34. Each cam finger 42 is adapted to engage a lug 43 on the hammer 40 with the result of moving the hammer away from the adjacent shaker bar, and when the cam finger is released from the lug the springs 41 throw the hammer into engagement with the shaker bar, thereby jarring the filtering device to which said shaker bar is secured.

I claim:—

1. A dust collector provided with filtering devices each having an outlet opening through which air is discharged during the filtering operations and also during cleaning operations, and a suction fan, each of said filtering devices being provided with a suction chamber for conducting air toward said suction fan during the filtering operations as well as during cleaning operations, a suction pipe common to both of said suction chambers leading from said suction chambers to said suction fan, combined with valves, arranged in said suction chambers, adapted to close communication between the suction chambers and said suction pipe, each of said suction chambers being provided with a normally closed inlet port, located adjacent to one of said valves, for the admission of air at a point between one of the filtering devices and said suction pipe.

2. A dust collector provided with filtering devices each having an outlet opening through which air is discharged during the filtering operations and also during cleaning operations, and a suction fan, each of said filtering devices being provided with a suction chamber for conducting air toward said suction fan during the filtering operations as well as during cleaning operations, a suction pipe common to both of said suction chambers leading from said suction chambers to said suction fan, combined with valves, arranged in said suction chambers, adapted to close communication between the suction chambers and said suction pipe, each of said suction chambers being provided with a normally closed inlet port, located adjacent to one of said valves, for the admission of air at a point between one of the filtering devices and said suction pipe, said valves being adapted to open and close said inlet ports.

3. A dust collector provided with filtering devices each having an outlet opening and a suction chamber communicating with said outlet opening, the dust receiving sides of said filtering devices being in open communication with each other, a suction fan for drawing air through each of said suction chambers during the filtering operation, each of the suction chambers being provided with an inlet port for the admission of air from the exterior of the filtering device and a closure normally closing said inlet ports, said closure being movable to close said outlet device at a point beyond said inlet port thereby opening said inlet port so as to permit the flow of air through said inlet port and through the filtering devices successively to the said suction fan.

4. A dust collector comprising a housing having an inlet opening for the admission of a dust laden air current and a plurality of outlet passageways, a valve adapted to prevent the admission of air at said inlet opening, filtering devices between said inlet opening and the outlet passageways, the dust receiving sides of said filtering devices being in open communication with each other, suction chambers communicating with said outlet pasageways adapted to receive air flowing from said filtering devices, an exhaust fan for drawing air through said suction chambers and the filtering devices associated therewith, each of said suction chambers being provided with an inlet port for the admission of air from the exterior of said housing, closures normally closing said inlet ports, each of said closures being movable to close a suction chamber at a point between its inlet port and said exhaust fan so as to deflect the air from an open inlet port into one of said filtering devices and through another of the filtering devices to said exhaust fan.

5. A dust collector comprising a housing having an inlet opening for the admission of a dust laden air current, a plurality of filtering devices arranged in said housing, each of said filtering devices being provided with an outlet passageway through which filtered air is discharged and the filtering devices being in open communication with each other so that a current of air may flow from one filtering device to the other, suction chambers communicating with said outlet passageways, an exhaust fan for drawing air through said suction chambers at the same time to move dust to all of said filtering devices, each of said suction chambers being provided with an inlet port for the admission of air from the exterior of said housing, means for closing either of said suction chambers to prevent air from flowing outwardly through the outlet passageways of either of the filtering devices thereby deflecting the air from one of said inlet ports, through the filtering devices successively and to said suction fan, said means including valves which normally close said inlet ports, the said valves being adapted to lie across the suction chambers at points between the inlet ports and said suction fan.

HENRY LECHTENBERG.

In the presence of—
  H. C. SPRICK,
  C. A. LECHTENBERG.